United States Patent [19]
Trancik et al.

[11] 3,725,451
[45] Apr. 3, 1973

[54] SUBSTITUTED BENZOYLHALOAL-KANESULFONANILIDES

[75] Inventors: Ronald J. Trancik; Robert A. Scherrer, both of White Bear Lake; Joseph Kenneth Harrington, Edina, all of Minn.

[73] Assignee: Riker Laboratories, Inc., Northridge, Calif.

[22] Filed: Apr. 13, 1970

[21] Appl. No.: 28,020

[52] U.S. Cl............260/456 A, 260/517, 260/556 A, 260/556 AR, 260/479 R, 260/556 SN, 260/556 AC, 260/470, 260/543 F, 260/543 R, 260/570 AB, 260/562 P, 260/516, 260/556 F, 424/303, 424/308, 424/311, 424/317, 424/321
[51] Int. Cl..............................................C07c 143/74
[58] Field of Search...260/556 F, 556 A, 479 R, 517, 260/456 A

[56] References Cited

UNITED STATES PATENTS 3,576,866   4/1971   Robertson et al.................260/556 F

*Primary Examiner*—Henry R. Jiles
*Assistant Examiner*—S. D. Winters
*Attorney*—Kinney, Alexander, Sell, Steldt & Delahunt

[57] ABSTRACT

Benzoylhaloalkanesulfonanilides having ring substituents selected from amino, nitro, carboxyl, mercapto, phenylsulfinyl, phenylsulfonyl, lower alkylsulfonamido, lower alkanoylamino, lower alkylthio, lower alkanoyloxy, lower alkylsulfamoyl, lower alkylsulfonoxy and lower haloalkylsulfonoxy. These compounds and salts thereof are active anti-inflammatory agents and some also have anti-pyretic and analgesic activity.

32 Claims, No Drawings

SUBSTITUTED BENZOYLHALOALKANESULFONANILIDES

Benzoylhaloalkanesulfonanilides having ring substituents selected from amino, nitro, carboxyl, mercapto, phenylsulfinyl, phenylsulfonyl, lower alkylsulfonamido, lower alkanoylamino, lower alkylthio, lower alkanoyloxy, lower alkylsulfamoyl, lower alkylsulfonoxy and lower haloalkyl-sulfonoxy. These compounds and salts thereof are active anti-inflammatory agents and some also have anti-pyretic and analgesic activity. Methods for the preparation and use of these compounds are also included.

Steroids having cortisone-like activity have heretofore been used for treatment of inflammatory, e.g., arthritic, conditions. While these are effective, they have certain undesirable side effects, particularly on the endocrine system. Consequently, there is a need for effective anti-inflammatory agents which are free of such disadvantages. The compounds of the present invention are non-steroidal in character, and their use does not entail side effects peculiar to steroid therapy. Of particular value in these is their relatively low toxicity. The physiological activities of these compounds have been elucidated by means of mammalian animal tests.

It is an object of the invention to provide compounds which are anti-inflammatory agents.

It is another object of the invention to provide compounds which are analgesic agents.

It is another object of the invention to provide compounds which are anti-pyretic agents.

It is a further object of the invention to provide a method for controlling inflammation in mammalian tissue.

It is a further object of the invention to provide a method for relieving pain.

It is still another object of the invention to provide anti-inflammatory compositions containing one or more benzoylhaloalkylsulfonanilides as active ingredients therein.

It is still another object of the invention to provide analgesic compositions containing one or more benzoylhaloalkylsulfonanilides as active ingredients therein.

It is still another object of the invention to provide anti-pyretic compositions containing one or more benzoylhaloalkylsulfonanilides as active ingredients therein.

Still other objects will be made apparent by the following specification.

DETAILED DESCRIPTION

According to the present invention there is provided a class of compounds of the formula:

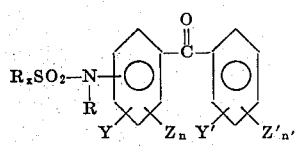

wherein $R_x$ is a lower haloalkyl radical, R is hydrogen, lower alkyl, cyano, lower alkylsulfonyl, fluoromethylsulfonyl, difluoromethylsulfonyl, trifluoromethylsulfonyl, chloromethylsulfonyl, a pharmaceutically acceptable cation or a group represented by the formula

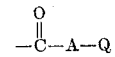

wherein A is —O— or a single carbon-carbon bond and Q is lower alkyl, Y and Y' are selected independently from the group consisting of hydrogen, amino, nitro, carboxyl, mercapto, phenylsulfinyl, phenylsulfonyl, lower alkylsulfonamido, lower alkanoylamino, lower alkylthio, lower alkanoyloxy, lower alkylsulfamoyl, lower alkylsulfonoxy and lower haloalkylsulfonoxy, provided that no more than one of Y and Y' may be hydrogen, Z and Z' are selected independently from the group consisting of lower alkyl, lower alkoxy, hydroxy and halogen and n and n' are independently 0–2. When n is zero, the phenyl ring bonded to the haloalkysulfonamido group is unsubstituted except for said group, Y, and the group connected thereto through the carbonyl. Similarly, when n' is zero, the second phenyl ring is unsubstituted except for the group shown in the formula (which is attached thereto through the carbonyl) and Y'. Preferably, n and n' are zero or 1, more preferably zero.

$R_x$ in the formula can be a straight or branched chain haloalkyl radical, and halogen can be fluorine, chlorine, bromine or iodine, preferably fluorine or chlorine. $R_x$ should have at least one halogen bonded to the alpha carbon atom or if there is no halogen bonded to the alpha carbon atom at least two halogens bonded to the beta carbon atom. The haloalkyl radicals may contain only one type of halogen, or the halogens may be mixed. When $R_x$ contains more than one carbon atom the halogen is preferably fluoro. Compounds where $R_x$ contains one carbon atom are preferred. Most preferred are compounds where $R_x$ is trifluoromethyl or difluoromethyl.

The term lower when applied to the radicals and substituents of the compounds of the invention refers to radicals and substituents containing from one to four carbon atoms.

The term lower alkanoylamino includes the group

and groups such as

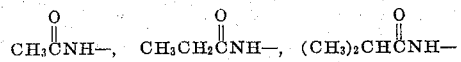

and the like.

The radical R is preferably hydrogen or a pharmaceutically acceptable cation. Compounds wherein R is lower alkyl, cyano, lower alkylsulfonyl, fluoromethylsulfonyl, difluoromethylsulfonyl, trifluoromethylsulfonyl, chloromethylsulfonyl and the group

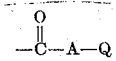

as defined above are generally less active than the corresponding compounds wherein R is hydrogen or a pharmaceutically acceptable cation, although they are often less toxic to mammalian species.

It appears that the active species is the compound wherein R is hydrogen, and that other R groups are converted to give the active species in vivo, although the invention is in no way limited by this theory. If a compound wherein R is other than hydrogen has a better therapeutic ratio ($LD_{50}/ED_{35}$) than the analogous compound wherein R is hydrogen, this compound may be preferred for therapeutic treatment.

When R is alkyl, methyl is preferred. When R is alkylsulfonyl, methylsulfonyl is preferred.

The group

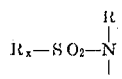

is preferably oriented meta to the benzoyl group.

When the substituents Y and/or Y' are lower alkylsulfonamido, lower alkanoylamino, lower alkylthio, lower alkanoyloxy, lower alkylsulfamoyl, lower alkylsulfonoxy and/or lower haloalkylsulfonoxy and the substituents Z and/or Z' are alkyl and/or alkoxy, the alkyl radicals preferably contain one or two carbon atoms. Y is preferably amino, formamido or lower alkanoyloxy when Y' is hydrogen.

The compounds of the invention are acidic in nature when R is hydrogen. Consequently, they form salts, e.g. compounds of formula I wherein R is a pharmaceutically acceptable cation. These can be prepared by treating the acid form (compounds of formula I in which R is hydrogen) with a stoichiometrically equivalent amount of the appropriate base under mild conditions. The pharmaceutically acceptable salts are generally the alkali metal (e.g. lithium, sodium and potassium), alkaline earth (e.g. barium, calcium and magnesium), aluminum, ammonium and amine salts. Appropriate bases for use in preparing the metal salts include metal oxides, hydroxides, carbonates, bicarbonates and alkoxides. Some salts are also prepared by cation exchange reactions (by reacting a salt of the invention with an organic or inorganic salt in a cation exchange reaction). The organic amine salts include the salts of alkylamines and aromatic amines, primary, secondary or tertiary (such amines including, for example, morpholine, methyl cyclohexylamine, glucosamine, etc.). These and the ammonium salts can be prepared by reacting the acid form with the appropriate organic base or ammonium hydroxide.

The salts of the invention are frequently formed by reacting the precursors in aqueous solution. This solution can be evaporated to obtain the salt of the compound, usually as a dry powder. In some cases, it may be more convenient to use a non-aqueous solvent such as alcohols, acetone, etc. The resulting solution is then treated to remove the solvent, for example, by evaporation under reduced pressure. Since many of the salts are water soluble, they are often used in the form of aqueous solutions. Also, they can be used in making pharmaceutical preparations in the form of capsules for oral administration.

Salts of quaternary ammonium compounds, for example choline salts, are also included among pharmaceutically acceptable salts of this invention.

The compounds of this invention or their precursors wherein R is hydrogen (the acid form) are prepared by reacting a substituted benzoylaniline with a haloalkanesulfonyl halide or anhydride according to the following scheme:

wherein $R_x$, Y, Y', Z, Z', $n$ and $n'$ are as previously defined and W represents a halogen atom, preferably fluorine or chlorine, or the corresponding anhydride grouping, $—OSO_2R_x$. Less direct routes may be preferred to obtain compounds of the invention, either in higher yields and/or in improved purity.

Approximately equivalent amounts of the reactants are brought together at temperatures most often ranging between about −15° and 150° C. If necessary or desirable, the reaction can be carried out in a pressure vessel. The reaction is preferably, but not necessarily, carried out in the presence of an acid acceptor such as the alkali or alkaline earth metal carbonates and bicarbonates or a tertiary amine such as pyridine, triethylamine or N,N-dimethylaniline. The amount of the acid acceptor can be varied widely; however, a 10 mole percent excess of that amount of base sufficient to bind the liberated strong acid (HW) is routinely employed.

The condensation is usually conducted in the presence of an appropriate inert organic solvent. Typical solvents suitable for this purpose are methylene chloride, chloroform, carbon tetrachloride, benzene, toluene, 1,2-dimethoxyethane, bis(2-methoxyethyl) ether, acetonitrile, nitromethane, N,N-dimethylformamide and the like.

After reaction is complete, if the reaction solvent is not water miscible, the product mixture can be extracted with a dilute aqueous base solution. The product, in the form of a salt which is usually soluble in the aqueous layer, is precipitated therefrom by addition of a mineral acid such as hydrochloric or sulfuric acid, and collected by filtration. Alternatively the product mixture can be washed with aqueous hydrochloric acid, the solvent evaporated in vacuo, and the residue dissolved in a dilute aqueous base solution which is washed with dichloromethane and treated with decolorizing charcoal. The product, in the form of a salt is then converted to the acid form and then isolated as described above.

If the reaction solvent is water miscible, the product is generally obtained by dilution of the reaction mixture with water. The product, a solid or oil, is separated and purified by conventional methods. Usually the compounds prepared according to the foregoing procedures are crystalline solids purified, in general, by recrystallization from aqueous alcohol, trichloroethylene, hexane, benzene-hexane mixtures and the like. Elution chromatography has also been found to be a useful purification technique.

In order to prepare the compounds of the invention wherein R is lower alkyl one reacts compounds of formula I wherein R is a metal ion, for example sodium or potassium, with a stoichiometric amount of alkyl bromide or iodide or a dialkyl sulfate in a non-reactive solvent such as acetone.

Compounds of the invention wherein R is cyano are prepared by reacting the corresponding compounds of the invention wherein R is a cation such as sodium or potassium with cyanogen chloride or bromide in a non-

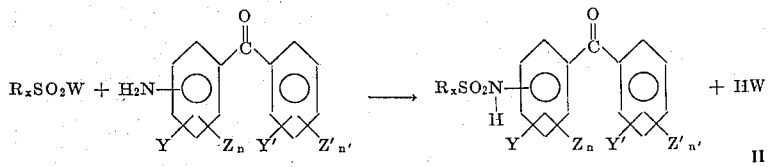

II reactive solvent.

Compounds of the invention wherein R is alkylsulfonyl or fluoromethylsulfonyl are prepared by reacting the corresponding compounds of the invention wherein R is a cation such as sodium or potassium with fluoromethanesulfonyl chloride or an alkylsulfonyl chloride.

Compounds of the invention wherein R is difluoromethylsulfonyl, trifluoromethylsulfonyl or chloromethylsulfonyl are also prepared by reacting compounds of the invention wherein R is a cation such as sodium or potassium with the corresponding halomethylsulfonyl halide or anhydride.

Compounds of the invention wherein R is a

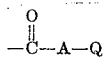

are prepared by reacting the corresponding compounds wherein R is a cation with an acylating agent of formula III,

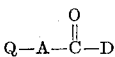

wherein A and Q are as defined hereinabove and D is halogen, preferably fluorine, chlorine or bromine, or the residue of an anhydride, i.e. an acyloxy group. A wide variety of acylating agents of formula III can be used in preparing the compound of the invention, including acyl halides or anhydrides, haloformates and the like. These compounds are either available directly, or the case of certain chloroformates are easily prepared from phosgene and the appropriate alcohol.

It will be understood and appreciated by those skilled in the art that certain substituents such as amino, carboxyl, mercapto, hydroxy, and the like will react in competition with the haloalkanesulfonamido group. Thus, in order to prepare compounds containing substituents Y and Y' which are reactive and which contain R equal to cyano, alkylsulfonyl, fluoroalkylsulfonyl and the aforementioned

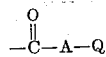

group, indirect synthetic routes may be preferred in order to obtain good yields or more easily purified products. Indirect synthetic routes may also be preferred for the preparation of compounds wherein R is difluoromethyl, trifluoromethyl or chloromethyl. It will also be understood that certain variations of these synthetic procedures cannot be used when functional substituents such as amino or hydroxy groups are present.

Suitable haloalkanesulfonyl anhydrides and halides (for example chlorides and fluorides) for use as starting materials in these procedures are known to the art, for example:

fluoromethanesulfonyl chloride,
difluoromethanesulfonyl chloride,
2,2,2-trifluoroethanesulfonyl chloride,
1,1,2,2-tetrafluoroethanesulfonyl chloride,
2,2,3,3-tetrafluoropropanesulfonyl chloride,
2-hydroperfluoropropanesulfonyl chloride,
trifluoromethanesulfonic anhydride
chloromethanesulfonyl chloride,
iodomethanesulfonyl chloride,
chlorofluoromethanesulfonyl chloride,
and many others, for example those disclosed in U.S. Pat. No. 2,832,398, and the Journal of the Chemical Society (London), 3058 (1960).

The substituted benzoylanilines (II) used in producing compounds of the invention are usually described in the general chemical literature or can be prepared from corresponding known substituted nitrobenzophenones by reduction. In cases where such intermediates are not known, they can be synthesized by methods used to prepare known intermediates. Haloalkylsulfonamidobenzophenones substituted by alkyl, hydroxy or phenylthio groups are prepared as described hereinafter. These compounds are used as intermediates to prepare compounds of the present invention. Compounds of the invention have also been prepared using other compounds of the invention as intermediates. In many cases this is the preferred method of synthesis for compounds of the invention. For example, 3-benzoyl-5-aminotrifluoromethanesulfonanilide may be prepared by reduction of 3-benzoyl-5-nitrotrifluoro-methanesulfonanilide with iron in acetic acid. The general method of synthesis of some novel benzoylanilines is described in detail hereinafter. In general, well-known synthetic procedures may be used to convert some compounds of the invention to other compounds of the invention. Such methods include reduction of nitro groups, acylation of amino groups, oxidation of sulfinyl groups to sulfonyl, oxidation of alkyl groups to carboxyl and the like.

As noted previously, the compounds of the present invention are effective anti-inflammatory agents and some also are analgesic and antipyretic agents. The anti-inflammatory activity can be conveniently demonstrated using assays designed to test the ability of these compounds to antagonize the local edema which is a characteristic of the anti-inflammatory response (rat foot edema test) and to inhibit the onset of the erythematous manifestation of inflammation (guinea pig erythema test).

The edema test is performed on adult female rats. One group of 10 rats serve as non-medicated controls, while another group of 10 rats receives the test compound at various times prior to the induction of the edema, usually 15 minutes, one hour and/or 18 hours. The test compound is administered as a suspension in 4 percent aqueous solution of acacia. Edema is induced by the plantar injection of 0.5 percent carrageenin (0.1 ml./foot) into the right hind foot. The left hind foot receives a like volume of 0.9 percent saline solution. Three hours later, the volume of each hind foot is determined plethysmographically. The edema is expressed as the increase in the volume of the edemogen injected foot (volume of the "edemogen foot" less the volume of the "saline foot"). The percent inhibition is calculated by dividing the mean percent increase in the edema of the edemogen foot of the medicated group, multiplied by 100. An active dose is that giving a statistically significant inhibition of the induced edema, usually about 30–35 percent inhibition.

Leading references to this method are:
1. Adamkiewicz et al., Canad. J. Biochem. Physio. 33:332, 1955;
2. Selye, Brit. Med. J. 2:1129, 1959; and
3. Winter, Proc. Soc. Exper. Biol. Med. 111:544, 1962.

The erythema test is performed on adult, albino guinea pigs of either sex weighing 400–600 g. Hair is removed from the abdomen of the animals by a depilatory mixture the afternoon of the day prior to the day on which they are to be used. One group of 5 animals serves as non-medicated controls, while another group of 5 receives the test compound 30 minutes prior to direct exposure to ultraviolet light. For induction of erythema, the animal is restrained on a small animal board. Three circular sections (6–8 mm. in diameter) of the ventrolateral abdominal area of the animal are then exposed to a controlled amount of ultraviolet radiation. Two hours after exposure, the erythema is scored 0–5 on the basis of intensity and completeness (full or partial circles). The maximal score per animal is 15. The percent inhibition is calculated on the basis of the mean score for the medicated group versus the non-medicated group. An active dose is taken to be that giving a statistically significant inhibition of the induced erythema, usually 35–40 percent inhibition. Modifications of this test include variation in the time and method of drug administration.

Leading references to this method are:
1. Wilhelmi, Schweiz. Med. Wschr. 79:577, 1949, and
2. Winder et al., Arch. Int. Pharmacodyn. 116:361, 1958.

In the rat foot edema test and/or guinea pig erythema test the following compounds are effective anti-inflammatory agents (i.e. have significant activity) at dosage levels of 100 mg./kg. or less in single doses:
4-amino-3-benzoyltrifluoromethanesulfonanilide,
4-formamido-3-benzoyltrifluoromethanesulfonanilide,
4-acetoxy-3-benzoyltrifluoromethanesulfonanilide,
3-amino-5-benzoyltrifluoromethanesulfonanilide,
3-benzoyl-5-nitrotrifluoromethanesulfonanilide and
3-(4-methylthiobenzoyl)trifluoromethanesulfonanilide.

The compounds of the invention are preferably administered orally, for example as four percent acacia suspensions, but also may be administered parenterally. Amounts are generally about 1 to 500 mg./kg. of body weight of the mammal to be treated.

The following examples are given for the purpose of further illustrating the procedures of the present invention, but are not intended in any way to be limiting on the scope thereof.

All melting points in the examples are uncorrected. The boiling points and melting points are given in degrees Centigrade and the pressures in millimeters of mercury.

EXAMPLE 1

General procedure for the preparation of the nitrobenzophenones by Friedel-crafts Reactions.

An optionally substituted aroyl halide (0.15 mole) is dissolved in a suitable solvent, for example 1,2-dichloroethane or the aromatic compound to be aroylated. This solution also contains the aromatic compound (0.15 mole or excess) to be aroylated, if said aromatic compound is not the solvent. It is added dropwise with cooling (if necessary) to a mixture of aluminum chloride (0.15 mole) and solvent. The reaction mixture is added to a solution of five percent hydrochloric acid and stirred at least one hour (generally two or more). The organic layer is separated, washed with five percent sodium bicarbonate solution, water and saturated sodium chloride solution, dried over magnesium sulfate and evaporated in vacuo. The structure of the resulting solid product is checked through its infrared spectrum. Recrystallization from ethanol-water mixtures is generally useful.

EXAMPLE 2

General procedure for the preparation of the substituted aminobenzophenones by reduction of the substituted nitrobenzophenones.

In a three-necked, round-bottomed flask equipped with a stirrer, reflux condenser and thermometer is dissolved the substituted nitrobenzophenone (50 mmole) in glacial acetic acid (100 ml.) at 90°–95° C. Water (25 ml.) is added halfway through the addition. The reaction mixture is maintained at 90°–95° C. for one-half hour after the completion of the addition. The reaction mixture is diluted with an equal volume of water, then extracted with diethyl ether. The ether extracts are washed with water, 5 percent sodium carbonate solution and finally water, then dried over magnesium sulfate. The solvent is removed in vacuo to give a solid. The solids can usually be recrystallized from ethanol-water mixtures.

EXAMPLE 3

General procedure for the sulfonylation of the substituted aminobenzophenones.

In a three-necked, round-bottomed flask equipped with a magnetic stirrer, a reflux condenser, a thermometer and an additional funnel is placed a substituted aminobenzophenone, (30 mmole), chloroform (50 ml.) and N,N-dimethylaniline (33 mmole). To this stirred mixture a haloalkanesulfonic anhydride (or haloalkanesulfonyl chloride), about 30 mmole, is added dropwise at such a rate that the reaction temperature does not exceed 45° C. The mixture is then stirred two hours at ambient temperature. the mixture is washed with five percent hydrochloric acid, then the solvent is removed in vacuo. The residue is taken up in five percent aqueous sodium hydroxide and washed with dichloromethane. The basic aqueous phase is then heated on a steam bath, treated with decolorizing charcoal and acidified with concentrated hydrochloric acid. This mixture is then extracted with dichloromethane, and the extracts dried over magnesium sulfate. The solvent is removed in vacuo, and the product purified by recrystallization or (usually) column chromatography followed by recrystallization, usually from saturated hydrocarbons or mixtures of benzene and saturated hydrocarbons.

Representative compounds of the invention prepared according to the general procedure of Example 3 are listed in Table I.

TABLE I

| Example No. | Compound | Melting Point (in °C.) |
|---|---|---|
| 4 | 3-(4-methylthiobenzoyl)trifluoromethanesulfonanilide | 149–151 |
| 5 | 3-(4-methoxybenzoyl)-5-nitrotrifluoromethanesulfonanilide | 174–175 |

| 6 | 3-benzoyl-5-nitrotrifluoromethanesulfonanilide | 147–149 |
| 7 | 4-acetamido-3-benzoyltrifluoromethanesulfonanilide | 138.5–139 |
| 8 | 3-(3-nitrobenzoyl)trifluoromethanesulfonanilide | oil, acceptable elemental analysis |

EXAMPLE 9

3-(4-Methylbenzoyl)trifluorometanesulfonanilide (6.9 g., 20 mmole), prepared from the known aminobenzophenone according to Example 3, water (100 ml.) and potassium permanganate (3.0 g.) are heated in a flask to 90° C. while stirring and maintained at 90° C. for thirty minutes. Potassium permanganate is added periodically and the disappearance of starting material is monitored by thin layer chromatography. The total potassium permanganate used is 10.5 g. (0.066 mole). After a total of three hours stirring at 90°–100° C., the mixture is stirred overnight at room temperature, filtered, the residue washed with hot water and discarded. The filtrate is treated with decolorizing charcoal, acidified and the product extracted with diethyl ether. The ether is washed with saturated sodium chloride solution, dried over magnesium sulfate and the solvent removed in vacuo. The 4-(3-trifluoromethylsulfonamidobenzoyl)benzoic acid is a white solid which is recrystallized from diethyl ether-benzene, m.p. 213°–215° C.

| Analysis: | % C | % H | % N |
|---|---|---|---|
| Calculated for $C_{15}H_{10}F_3NO_5S$: | 48.3 | 2.7 | 3.8 |
| Found: | 48.8 | 2.7 | 3.9 |

EXAMPLE 10

4-Acetamido-3-benzoyltrifluoromethanesulfonanilide is hydrolyzed in excess 10 percent sodium hydroxide by heating on a steam bath for one hour. The mixture is then neutralized with hydrochloric acid and extracted with dichloromethane. The organic extracts are dried over magnesium sulfate and evaporated in vacuo to give a yellow solid. The solid is recrystallized from cyclohexane-benzene to give 4-amino-3-benzoyltrifluoromethanesulfonanilide, m.p. 66°–67° C.

| Analysis: | % C | % H | % N |
|---|---|---|---|
| Calculated for $C_{14}H_{11}F_3N_2O_3S$: | 48.8 | 3.2 | 8.1 |
| Found | 49.2 | 3.3 | 8.0 |

EXAMPLE 11

Diphenylsulfide and 3-nitrobenzoyl chloride are reacted according to the general method of Example 1 to give 3-(4-phenylthiobenzoyl)nitrobenzene, which is reduced according to the general procedure of Example 2 to give 3-(4-phenylthiobenzoyl)aniline. This aniline is reacted with trifluoromethanesulfonic anhydride according to the procedure of Example 3 to give 3-(4-phenylthiobenzoyl)trifluoromethanesulfonanilide.

3-(4-Phenylthiobenzoyl)trifluoromethanesulfonanilide (2.0 g., 0.0046 mole) is dissolved in acetic acid and hydrogen peroxide (0.61 g., 0.018 mole) in acetic acid is added dropwise while maintaining the mixture at 0° C. The reaction is allowed to warm to about 50° C., then stirred overnight at ambient temperature. The reaction was poured into cold water and extracted with dichloromethane. The organic extracts are dried over magnesium sulfate, then the solvent is removed in vacuo. A white solid is obtained and recrystallized from cyclohexanebenzene to give 3-(4-phenylsulfinylbenzoyl)trifluoromethanesulfonanilide, m.p. 139°–141° C.

| Analysis: | % C | % H | % N |
|---|---|---|---|
| Calculated for $C_{20}H_{14}F_3NO_4S_2$: | 53.0 | 3.1 | 3.1 |
| Found: | 53.0 | 3.5 | 3.0 |

EXAMPLE 12

3-(4-Phenylthiobenzoyl)trifluoromethanesulfonanilide (1.5 g., 0.0035 mole), prepared as described in Example 11, is dissolved in acetic acid and hydrogen peroxide (0.26 g., 0.0088 moles) in acetic acid is added dropwise while maintaining the mixture at 0° C. The reaction is allowed to warm to about 50° C. and stirred at 50° C. for 3 hours, then cooled to room temperature and allowed to stir overnight. The reaction is poured into cold water and extracted with dichloromethane. The organic extracts are dried over magnesium sulfate, then the solvent is removed in vacuo. A white solid was obtained and recrystallized from cyclohexane-benzene to give 3-(4-phenylsulfonylbenzoyl)trifluoromethanesulfonanilide, m.p. 145°–146° C.

| Analysis: | % C | % H | % N |
|---|---|---|---|
| Calculated for $C_{20}H_{14}F_3NO_5S_2$: | 51.2 | 3.0 | 3.0 |
| Found: | 51.3 | 3.0 | 3.0 |

EXAMPLE 13

4-Amino-3-benzoyltrifluoromethanesulfonanilide (2,0 g., 58 mmoles) and formamide (50 ml.) are heated on a steam bath for two days. The reaction mixture is poured into five percent hydrochloric acid, and the solid product is isolated by filtration. Column chromatography followed by recrystallization from a benzene-cyclohexane mixture gives white 4-formamido-3-benzoyltrifluoromethanesulfonanilide, m.p. 196°–197° C.

| Analysis: | % C | % H | % N |
|---|---|---|---|
| Calculated for $C_{15}H_{11}F_3N_2O_4S$: | 48.4 | 3.0 | 7.5 |
| Found: | 48.3 | 2.9 | 7.5 |

EXAMPLE 14

3,5-Dinitrobenzophenone is prepared by the Friedel-Crafts reaction of 3,5-dinitrobenzoyl chloride with benzene according to Example 1. Reaction of 3,5-dinitrobenzophenone with sodium methoxide in refluxing methanol gives a high yield of 3-methoxy-5-nitrobenzophenone, which is reduced according to Example 2 to 3-amino-5-methoxybenzophenone. 3-Amino-5-methoxybenzophenone is reacted with trifluoromethanesulfonic anhydride according to the procedure of Example 3 to give 3-benzoyl-5-methoxytrifluoromethanesulfonanilide, which is reacted with hydroiodic acid in acetic acid to give 3-benzoyl-5-hydroxytrifluoromethanesulfonanilide.

3-Benzoyl-5-hydroxytrifluoromethanesulfonanilide (4.5 g., 0.013 mole) in chloroform (50 ml.), triethylamine (2.0 ml., 0.014 mole) and trifluoromethanesulfonyl chloride (2.2 g., 0.013 mole) are stirred at 60° C. for 24 hours. The solution is cooled, washed with 5 percent hydrochloric acid and the organic layer is evaporated in vacuo. The residue is chromatographed on acid alumina and the product is recrystallized from cyclohexane-benzene to give 3-benzoyl-5-trifluoromethylsulfonoxytrifluoromethanesulfonanilide, m.p. 135°–136° C.

Analysis:
Calculated for $C_{15}H_9F_6NO_6S$:
|  | % C | % H | % N |
|---|---|---|---|
| Calculated | 37.8 | 1.9 | 2.9 |
| Found | 37.6 | 1.9 | 2.9 |

EXAMPLE 15

3-Benzoyl-5-hydroxytrifluoromethanesulfonanilide (4.5 g., 0.013 mole), prepared as described in Example 18, in chloroform (50 ml.), triethylamine (2.0 ml., 0.014 mole) and methanesulfonyl chloride (1.5 g., 0.013 mole) are stirred at 60° C. for 24 hours. The solution is cooled, washed with 5 percent hydrochloric acid and the organic layer is evaporated in vacuo. The residue is chromatographed on acid alumina, and the product is recrystallized from cyclohexanebenzene to give 3-benzoyl-5-methylsulfonoxytrifluoromethanesulfonanilide, m.p. 101°–102° C.

Analysis:
Calculated for $C_{15}H_{12}F_3NO_6S_2$:
|  | % C | % H | % N |
|---|---|---|---|
| Calculated | 42.6 | 2.8 | 3.3 |
| Found | 42.8 | 2.9 | 3.2 |

EXAMPLE 16

2-Chloro-5-nitrobenzophenone is reacted with sodium methoxide in methanol to give 2-methoxy-5-nitrobenzophenone, which is reduced according to Example 2 to give 5-amino-2-methoxybenzophenone. The amino compound is reacted with trifluoromethanesulfonic anhydride according to Example 3 to give 3-benzoyl-4-methoxytrifluoromethanesulfonanilide, which is reacted with hydroiodic acid in acetic acid to give 3-benzoyl-4-hydroxytrifluoromethanesulfonanilide.

3-Benzoyl-4-hydroxytrifluoromethanesulfonanilide (3.2 g., 0.01 mole) in chloroform (50 ml.) with dimethylaniline (1.4 g., 0.011 mole) is treated with acetyl chloride (0.8 g., 0.01 mole) at about 5° C. The reaction is then stirred at ambient temperature overnight, washed with hydrochloric acid and the organic layer is evaporated in vacuo. The residue is recrystallized from benzene-cyclohexane to give a light green solid, 4-acetoxy-3-benzoyltrifluoromethanesulfonanilide, m.p. 132°–133° C.

Analysis:
Calculated for $C_{16}H_{12}F_3NO_5S$:
|  | % C | % H | % N |
|---|---|---|---|
| Calculated | 49.7 | 3.1 | 3.6 |
| Found | 49.3 | 3.3 | 3.6 |

Additional compounds which are exemplary of the invention are shown in the following table.

TABLE II

| Example No. | Compound |
|---|---|
| 17 | 3-benzoyl-4-nitro-N-methyltrifluoromethanesulfonanilide |
| 18 | 4-amino-2-benzoyldifluoromethanesulfonanilide |
| 19 | 2-amino-4-benzoylfluoromethanesulfonanilide |
| 20 | 3-(4-methylthiobenzoyl)chloromethanesulfonanilide |
| 21 | 4-acetoxy-3-benzoyl-2,2,2-trifluoroethanesulfonanilide |
| 22 | sodium 4-acetoxy-3-benzoylperfluorobutanesulfonanilide |
| 23 | 3-benzoyl-5-methylsulfonamidotrifluoromethanesulfonanilide |
| 24 | 3-(4-mercaptobenzoyl)trifluoromethanesulfonanilide |
| 25 | 3-benzoyl-4-mercaptotrifluoromethanesulfonanilide |
| 26 | 3-amino-5-benzoyltrifluoromethanesulfonanilide |
| 27 | 4-amino-3-benzoyldifluoromethanesulfonanilide |
| 28 | sodium 4-acetoxy-3-benzoyltrifluoromethanesulfonanilide |
| 29 | 3-benzoyl-5-nitrodifluoromethanesulfonanilide |
| 30 | 3-(4-methylthiobenzoyl)difluoromethanesulfonanilide |
| 31 | 4-acetamido-3-benzoyldifluoromethanesulfonanilide |
| 32 | 3-(4-phenylsulfinylbenzoyl)difluoromethanesulfonanilide |
| 33 | 3-(4-phenylsulfonylbenzoyl)difluoromethanesulfonanilide |
| 34 | 4-(3-difluoromethylsulfonamidobenzoyl)benzoic acid |
| 35 | sodium 4-formamido-3-benzoyltrifluoromethanesulfonanilide |
| 36 | 3-benzoyl-5-trifluoromethylsulfonoxydifluoromethanesulfonanilide |
| 37 | 3-benzoyl-5-methylsulfonoxydifluoromethanesulfonanilide |
| 38 | 5-amino-3-benzoyldifluoromethanesulfonanilide |
| 39 | 3-amino-5-(4-hydroxybenzoyl)trifluoromethanesulfonanilide |
| 40 | 3-acetamido-5-(4-methoxybenzoyl)trifluoromethanesulfonanilide |
| 41 | 3-(3-N,N-dimethylsulfamoylbenzoyl)difluoromethanesulfonanilide |
| 42 | N-methylsulfonyl-3-(4-methylthiobenzoyl)trifluoromethanesulfonanilide |
| 43 | N-fluoromethylsulfonyl-3-nitro-5-benzoyltrifluoromethanesulfonanilide |
| 44 | N-cyano-3-nitro-5-benzoyltrifluoromethanesulfonanilide |
| 45 | N-acetyl-4-acetamido-3-benzoyltrifluoromethanesulfonanilide |
| 46 | N-ethoxycarbonyl-3-nitro-5-benzoyltrifluoromethanesulfonanilide |

EXAMPLE 47

Sodium 4-formamido-3-benzoyltrifluoromethanesulfonanilide (Example 35) in acetone is stirred while adding an equimolar amount of methanesulfonyl chloride, and stirring is contained overnight. The mixture is filtered, and the filtrate is evaporated in vacuo. The residue is dissolved in dichloromethane, then washed with dilute sodium hydroxide and finally with water. The product, N-methyl-sulfonyl-4-formamido-3-benzoyltrifluoromethanesulfonanilide, is recovered by evaporation of the dichloromethane.

EXAMPLE 48

Sodium 4-formamido-3-benzoyltrifluoromethanesulfonanilide is dissolved in 1,2-dimethoxyethane by gentle heating. An equimolar amount of cyanogen bromide is dissolved in a small amount of 1,2-dimethoxyethane and added to the warm solution. The mixture is heated to its reflux temperature and maintained there for one hour. The mixture is filtered and the filtrate is evaporated in vacuo to give the desired product N-cyano-4-formamido-3-benzoyltrifluoromethanesulfonanilide.

EXAMPLE 49

Sodium 4-acetoxy-3-benzoyltrifluoromethanesulfonanilide in acetone is combined with an equimolar amount of ethyl chloroformate and the mixture is stirred at room temperature overnight. The mixture is filtered and the filtrate evaporated in vacuo to give N-ethoxycarbony-4-acetoxy-3-benzoyl-trifluoromethanesulfonanilide.

What is claimed is:

1. A compound of the formula

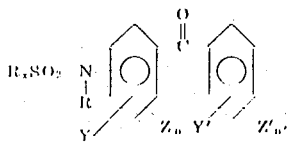

wherein $R_x$ is a lower haloalkyl radical, R is hydrogen, lower alkyl, or a pharmaceutically acceptable cation, Y and Y' are selected independently from the group consisting of hydrogen, amino, nitro, carboxyl, mercapto, phenylsulfinyl, phenylsulfonyl, lower alkylsulfonamido, lower alkanoylamino, lower alkylthio, lower alkylsulfamoyl, lower alkylsulfonoxy and lower haloalkylsulfonoxy, provided that no more than one of Y and Y' may be hydrogen, Z and Z' are selected independently from the group consisting of lower alkyl, lower alkoxy, hydroxy and halogen and n and n' are independently 0-2.

2. A compound of the formula

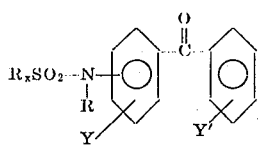

according to claim 1.

3. A compound according to claim 1 in which $R_x$ is trifluoromethyl.

4. A compound according to claim 1 in which $R_x$ is difluoromethyl.

5. A compound according to claim 2 in which Y' is hydrogen and Y is amino.

6. A compound according to claim 1 in which Y' is hydrogen.

7. A compound according to claim 2 in which Y' is hydrogen.

8. A compound according to claim 1 in which Y is hydrogen.

9. A compound according to claim 2 in which Y is hydrogen.

10. A compound according to claim 1 wherein the  group is oriented meta to the benzoyl group.

11. A compound according to claim 2 in which Y is formamido and Y' is hydrogen.

12. A compound according to claim 1 in which R is hydrogen.

13. A compound according to claim 1 in which R is lower alkyl.

14. A compound according to claim 1 in which R is a pharmaceutically acceptable cation.

15. A compound according to claim 1 in which at least one of Y and Y' is amino.

16. A compound according to claim 1 in which at least one of Y and Y' is nitro.

17. A compound according to claim 1 in which at least one of Y and Y' is carboxyl.

18. A compound according to claim 1 in which at least one of Y and Y' is mercapto.

19. A compound according to claim 1 in which at least one of Y and Y' is phenysulfinyl.

20. A compound according to claim 1 in which at least one of Y and Y' is phenylsulfonyl.

21. A compound according to claim 1 in which at least one of Y and Y' is lower alkylsulfonamido.

22. A compound according to claim 1 in which at least one of Y and Y' is lower alkanoylamino.

23. A compound according to claim 1 in which at least one of Y and Y' is lower alkylthio.

24. A compound according to claim 1 in which at least one of Y and Y' is lower alkylsulfamoyl.

25. A compound according to claim 1 in which at least one of Y and Y' is lower alkylsulfonoxy.

26. A compound according to claim 1 in which at least one of Y and Y' is lower haloalkylsulfonoxy.

27. A compound of the formula

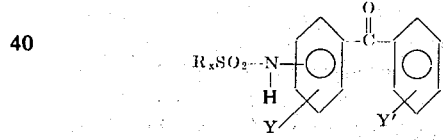

according to claim 1.

28. A compound according to claim 3 in which Y is amino and Y' is hydrogen.

29. 3-Amino-5-benzoyltrifluoromethanesulfonanilide according to claim 7.

30. 4-Amino-3-benzoyltrifluoromethanesulfonanilide according to claim 7.

31. A compound according to claim 11 in which R is hydrogen.

32. 3-Benzoyl-4-formamidotrifluoromethanesulfonanilide according to claim 11.

* * * * *